(12) United States Patent
Shim et al.

(10) Patent No.: US 9,955,137 B2
(45) Date of Patent: *Apr. 24, 2018

(54) METHOD AND APPARATUS FOR DISPLAYING A 3D IMAGE IN A MOBILE TERMINAL

(71) Applicant: Samsung Electronics Co., Ltd., Gyeonggi-do (KR)

(72) Inventors: Junghyun Shim, Gyeonggi-do (KR); Hyuncheol Park, Gyeonggi-do (KR); Sujin Yeon, Seoul (KR); Yeonhee Lee, Seoul (KR); Yongyeon Lee, Gyeonggi-do (KR); Hyewon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 78 days.

This patent is subject to a terminal disclaimer.

(21) Appl. No.: 14/691,096

(22) Filed: Apr. 20, 2015

(65) Prior Publication Data

US 2015/0229905 A1 Aug. 13, 2015

Related U.S. Application Data

(63) Continuation of application No. 13/689,181, filed on Nov. 29, 2012, now Pat. No. 9,013,476.

(30) Foreign Application Priority Data

Dec. 13, 2011 (KR) .................. 10-2011-0133818

(51) Int. Cl.
*G06F 3/041* (2006.01)
*G06T 19/00* (2011.01)
(Continued)

(52) U.S. Cl.
CPC ......... *H04N 13/0022* (2013.01); *G06F 3/041* (2013.01); *G06F 3/044* (2013.01);
(Continued)

(58) Field of Classification Search
CPC ........ G06F 3/041; G06F 3/0414; G06F 3/044; G06F 3/046; G06T 19/00; H04N 13/0022;
(Continued)

(56) References Cited

U.S. PATENT DOCUMENTS

2007/0120846 A1 5/2007 Ok et al.
2009/0083155 A1* 3/2009 Tudor ................ G06Q 30/0273
705/14.69
(Continued)

FOREIGN PATENT DOCUMENTS

EP 2 386 939 11/2011
KR 1020070046448 5/2007
KR 1020110053660 5/2011

OTHER PUBLICATIONS

European Search Report dated Jun. 25, 2015 issued in counterpart application No. 12856789.8-1903, 9 pages.

*Primary Examiner* — Sing-Wai Wu
(74) *Attorney, Agent, or Firm* — The Farrell Law Firm, P.C.

(57) ABSTRACT

A method and apparatus are provided for displaying a three dimensional (3D) image in a mobile communication terminal. The method includes displaying an image comprising at least one object; sensing a touch gesture selecting an object for changing a three dimensional depth of the object among the at least one object with the image displayed; checking the three dimensional depth of the selected object; determining the three dimensional depth of the selected object based on the checked three dimensional depth; and displaying the selected object reflecting the determined three dimensional depth.

18 Claims, 11 Drawing Sheets

(51) Int. Cl.
*H04N 13/00* (2018.01)
*H04N 13/04* (2006.01)
*G06F 3/044* (2006.01)
*G06F 3/046* (2006.01)

(52) U.S. Cl.
CPC ............ *G06F 3/046* (2013.01); *G06F 3/0414* (2013.01); *G06T 19/00* (2013.01); *H04N 13/0066* (2013.01); *H04N 13/0497* (2013.01); *H04N 2013/0081* (2013.01)

(58) Field of Classification Search
CPC ........... H04N 13/0066; H04N 13/0497; H04N 2013/0081
See application file for complete search history.

(56) References Cited

U.S. PATENT DOCUMENTS

| | | | |
|---|---|---|---|
| 2009/0160931 A1* | 6/2009 | Pockett | H04N 13/0018 348/42 |
| 2010/0090971 A1* | 4/2010 | Choi | G06F 3/04883 345/173 |
| 2010/0095206 A1 | 4/2010 | Kim | |
| 2011/0010666 A1 | 1/2011 | Choi | |
| 2011/0078568 A1* | 3/2011 | Park | G06F 3/04883 715/702 |
| 2011/0093778 A1 | 4/2011 | Kim et al. | |
| 2011/0115788 A1 | 5/2011 | Lee | |
| 2011/0181706 A1 | 7/2011 | Harrold et al. | |
| 2011/0281619 A1 | 11/2011 | Cho et al. | |
| 2011/0292190 A1 | 12/2011 | Kim et al. | |
| 2011/0296357 A1 | 12/2011 | Kim | |

* cited by examiner

FIG. 3
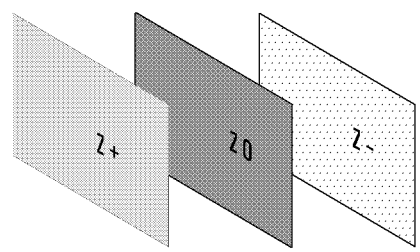
Z+ : Crossed Disparity 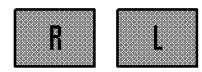
Z 0 : Zero Disparity (SCREEN) 
Z− : Uncrossed Disparity 
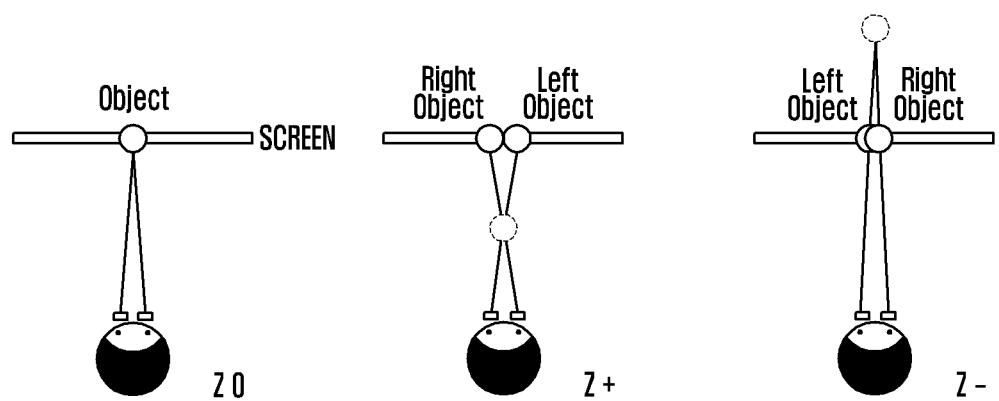

[a]　　　　　　　　　　　　　[b]

METHOD AND APPARATUS FOR DISPLAYING A 3D IMAGE IN A MOBILE TERMINAL

PRIORITY

This continuation application claims priority under 35 U.S.C. § 120 to U.S. patent application Ser. No. 13/689,181 (now in condition for allowance), which was filed on Nov. 29, 2012, which claims priority under 35 U.S.C. § 119(a) to a Korean Patent Application filed on Dec. 13, 2011 in the Korean Intellectual Property Office and assigned Serial No. 10-2011-0133818, the entire content of each which is incorporated herein by reference.

BACKGROUND OF THE INVENTION

1. Field of the Invention

The present invention relates generally to a method and apparatus for displaying an image in a mobile terminal, and more particularly, to a method and apparatus for displaying a three dimensional (3D) image utilizing a 3D image display function.

2. Description of the Related Art

Recently, interest in three dimensional (3D) images is rapidly increasing. Accordingly, efforts are being made to provide 3D imaging capabilities to television sets and mobile terminals.

3D images provide a sense of depth by utilizing a combination of left images and right images. More specifically, binocular disparity caused by the distance between a user's two eyes, which is approximately 65 mm, is a key factor in depth perception. Different images seen by the left and right eyes are transferred through the retinas to the brain, which fuses the images together, thereby creating depth perception.

Rapid advances in communication and semiconductor technologies have led to enormous popularization of mobile terminals. High-end mobile terminals have evolved into mobile convergence devices supporting heterogeneous functions originating from distinct fields. In particular, mobile terminals are increasingly equipped with touchscreens. Such a mobile terminal generates touch events corresponding to user actions on the touchscreen and controls applications on the basis of the generated touch events.

With rapid popularization of mobile terminals (smartphones, in particular), applications stored in a mobile terminal have increased in number and kind. Hence, it is necessary to provide a user interface method and apparatus that enable the user to access and manage many content items and applications stored in a mobile terminal in an easy and convenient manner.

SUMMARY OF THE INVENTION

The present invention has been made in view of the above-described problems and provides at least the advantages described below.

Accordingly, an aspect of the present invention is to provide a method and apparatus for displaying a 3D image in a mobile terminal.

Another aspect of the present invention is to provide a method and apparatus that enable the user to manipulate a mobile terminal utilizing a 3D image display function.

In accordance with an aspect of the present invention, a method is provided for displaying a three dimensional (3D) image in a mobile communication terminal. The method includes displaying an image comprising at least one object; sensing a touch gesture selecting an object for changing a three dimensional depth of the object among the at least one object with the image displayed; checking the three dimensional depth of the selected object; determining the three dimensional depth of the selected object based on the checked three dimensional depth; and displaying the selected object reflecting the determined three dimensional depth.

In accordance with another aspect of the present invention, an apparatus is provided for displaying a three dimensional (3D) image in a mobile communication terminal. The apparatus includes a memory configured to store an object and a disparity associated with the object; a 3D display configured to display an image comprising at least one object with depth perception; a touchscreen configured to sense a touch gesture selecting an object for changing a three dimensional depth of the object among the at least one object; and a controller configured to check the three dimensional depth of the selected object, determine the three dimensional depth of the selected object based on the checked three dimensional depth, and control the 3D display to display the selected object reflecting the determined three dimensional depth.

BRIEF DESCRIPTION OF THE DRAWINGS

The above and other aspects, features, and advantages of the present invention will be more apparent from the following detailed description in conjunction with the accompanying drawings, in which:

FIG. 3 illustrates examples of disparity according to an embodiment of the present invention;

DETAILED DESCRIPTION OF EMBODIMENTS OF THE INVENTION

Figure 1:
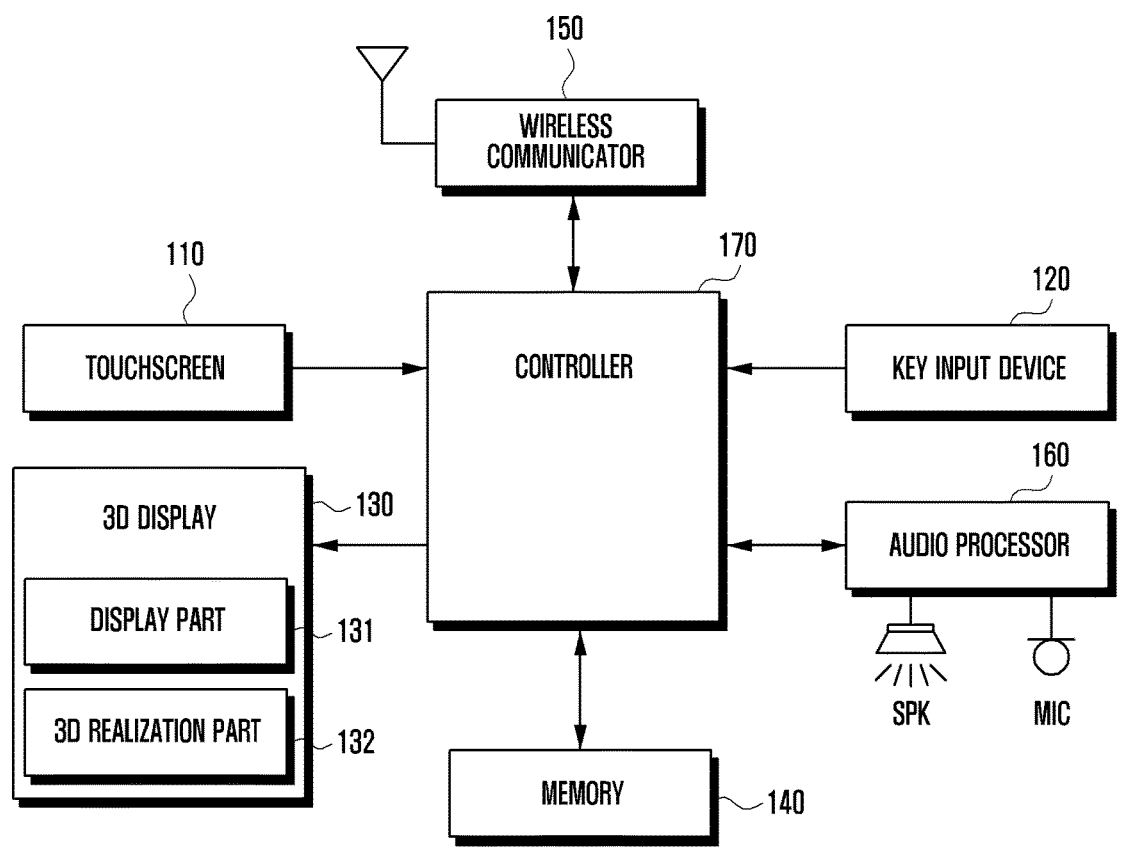
FIG. 1 is a block diagram illustrating a mobile terminal according to an embodiment of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Herein, the term "object" refers to a constituent element of a 3D image displayable by a mobile terminal. An object may be a graphical entity for interfacing with the user such as an icon, menu, list, folder or thumbnail that is associated with a specific function of a content item, program or application. That is, when an object is selected by the user, the mobile terminal executes a function associated with the object. Further, a 3D object is composed of a left object corresponding to a user's left eye and a right object corresponding to the user's right eye.

Additionally, the term "disparity" refers to a distance between a left object and a right object. Disparity may be crossed disparity, zero disparity, or uncrossed disparity. With a reference plane, an object in front of the reference plane produces crossed disparity; an object behind the reference plane produces uncrossed disparity; and an object on the reference plane produces zero disparity. Here, the reference plane may be a virtual plane between the display screen and the user or the display screen itself.

Although embodiments of the present invention will be described below wherein a mobile terminal is assumed to be a smartphone, the embodiments are also applicable to other mobile terminals, such as cellular phones, tablet computers, handheld computers, Portable Multimedia Players (PMPs), a Personal Digital Assistants (PDAs), etc.

In accordance with an embodiment of the present invention, a method and apparatus are provided that adjust a depth of an object by controlling disparity between a left object and a right object.

Herein, when the XY plane is the reference plane, the depth corresponds to the distance in the direction of the Z-axis. More specifically, when the object is on the reference plane, the depth thereof is zero; when the object is in front of the reference plane, the depth thereof is positive; and when an object is behind the reference plane, the depth thereof is negative.

Utilizing the depth of the object, a user may intuitively recognize attribute information of the object. Herein, attribute information represents an attribute of a content item or application associated with the object, such as information regarding a category, usage frequency, size (in bytes), hyperlink, and execution indication. Usage frequency information indicates the usage frequency of a content item or application. For example, for a music file or moving image file, the usage frequency information may indicate the frequency of playbacks.

Attribute information includes user input information, which is entered by the user to identify a content item or application. User input information may be marking information that is attached by the user to a frequently used content item or application.

Categories defined by the user to classify content items may also be user input information.

FIG. 1 is a block diagram illustrating a mobile terminal according to an embodiment of the present invention.

Referring to FIG. 1, the mobile terminal includes a touchscreen 110, a key input device 120, a 3D display 130, a memory 140, a wireless communicator 150, an audio processor 160, which is connected to a speaker SPK and a microphone MIC, and a controller 170.

The touchscreen 110, which is positioned on the 3D display 130, generates a touch event corresponding to a touch gesture made by a user on the touchscreen 110 and sends the touch event to the controller 170. The controller 170 may control other components on the basis of a touch event sent by the touchscreen 110. For example, touch gestures include a touch, a tap, a double tap, a press, a drag, a drag and drop, and a sweep. More specifically, a touch corresponds to single point contact with the screen; a tap corresponds to touch and release at the same point; a double tap corresponds to two consecutive taps at the same point; a press corresponds to long touch and release at the same point; a drag corresponds to touch and move in one direction; a drag and drop corresponds to drag and release; and a sweep corresponds to touch and fast move. Additionally, a drag and a sweep are also referred to as a scroll and a flick, respectively.

The controller 170 distinguishes a sweep from a drag based on movement speed.

For example, the touchscreen 110 may be a resistive type touchscreen, a capacitive type touchscreen, an electromagnetic induction type touchscreen, or a pressure type touchscreen.

The key input device 120 includes, for example, a plurality of alphanumeric and function keys for inputting alphanumeric information and for setting various functions. The function keys may include direction, side, and shortcut keys associated with corresponding functions. The key input device 120 transmits key signals from the user for setting and controlling the mobile terminal 100 to the controller 170. The controller 170 controls the components of the mobile terminal according to received key signals.

For example, the key input device 120 may include a QWERTY keypad, a 3*4 keypad, or a 4*3 keypad. However, when the mobile terminal is a full touchscreen type device, i.e., a terminal without a physical keypad, which the key input device 120 includes, for example, one or more side keys for performing various operations, such as screen on/off or power on/off.

The 3D display 130 displays images with realistic depth perception under control of the controller 170. To achieve this, the 3D display 130 includes a display part 131 for displaying the images and a 3D realization part 132 to produce the depth perception of displayed images.

More specifically, the display part 131 converts image data from the controller 170 into an analog signal and displays the analog signal under control of the controller 170. For example, the display part 131 outputs various screens generated while using the mobile terminal, such as a lock screen, a home screen, an application screen, a menu screen, a keypad screen, a messaging screen, an Internet access screen, etc. The lock screen is displayed when the 3D display 130 is turned on.

When a given touch event for unlocking is generated, the controller 170 transitions from the lock screen to the home screen or a preset application screen. The home screen includes a plurality of icons mapped to various applications.

When one of the icons is selected by the user, the controller 170 executes an application mapped with the selected icon and controls the 3D display 130 to display the corresponding application screen. Specifically, the display part 131 displays a screen having one or more objects under control of the controller 170. As described before, an object may be an icon, a menu, a list, a folder, a thumbnail, etc.

For example, the display part 131 may be a flat display panel including Liquid Crystal Display (LCD) devices, Organic Light Emitting Diodes (OLEDs), or Active Matrix Organic Light Emitting Diodes (AMOLEDs).

The 3D realization part 132 is positioned over the display part 131 and causes the left and right eyes to view different images.

3D realization schemes are generally classified into schemes with glasses and schemes without glasses. For example, 3D schemes with glasses utilize color filters, polarization filters, or shutter glasses, and 3D schemes without glasses utilize lenticular lenses or parallax barriers. As these 3D realization schemes are known in the art, detailed descriptions thereof are omitted herein.

The memory 140 may store an Operating System (OS) of the mobile terminal 100, various applications and various content items. The memory 140 may include a data section and a program section.

The data section of the memory 140 stores data generated while using the mobile terminal 100, downloaded content items, and attribute information of the content items. For example, content items include contacts, images, documents, moving images, text messages, emails, music files, etc.

Additionally, the data section stores attribute information of applications and screens to be output to the 3D display 130. For example, various keypad screens such as a 3*4 keypad or QWERTY keypad may be stored. Various menu screens, containing a key for screen transition (for example, back key to return to the previous screen) and a key for application control, may also be stored.

Further, the data section may temporarily store data extracted from a message, photograph, webpage or document, for copy and paste. The data section may store various setting option values (for example, screen brightness, vibration upon touch, and automatic screen rotation) for operation of the mobile terminal.

Additionally, the data section stores a lookup table, which enables the controller 170 to determine the depth of a desired object based on the attribute information. Table 1 illustrates an example of such a lookup table.

TABLE 1

| Usage frequency | Depth |
| --- | --- |
| High | Z+ |
| Medium | Z0 |
| Low | Z− |

In Table 1, "usage frequency" refers to how often the user uses a content item or program associated with an object, and the usage frequencies are classified into three levels (high, medium, and low). However, the usage frequencies may also be classified into a different number of levels.

In Table 1, "Z+" indicates a disparity value that causes the image of an object to be displayed in front of the reference plane; "Z0" indicates a disparity value that causes the image of an object to be displayed on the reference plane; and "Z−" indicates a disparity value that causes the image of an object to be displayed behind the reference plane. Accordingly, when using Table 1, frequently used objects appear to protrude from the reference plane, so that the user may readily recognize the frequently used objects. That is, objects that are more frequently used are displayed closer to the user.

Table 2 illustrates another lookup table.

TABLE 2

| User input information | Depth |
| --- | --- |
| O | Z+ |
| X | Z0 |

In Table 2, 'O' indicates that user input information is attached to a content item or application, and 'X' indicates that user input information is not attached to a content item or application. Accordingly, when using Table 2, objects having user input information appear to protrude from the reference plane.

Additionally, criteria for determining a depth of is not limited to usage frequencies or user input information, but may also utilize size information, as shown in Table 3 below, or other attribute information. Accordingly, the criterion and number of classification levels for a lookup table may be determined according to user intentions.

TABLE 3

| Size | Depth |
| --- | --- |
| Greater than or equal to 10 MB | Z+ |
| Less than 10 MB | Z0 |

The program section of the memory 140 stores an OS for booting the mobile terminal and operating individual components and various applications thereof. For example, the program section may store a web browser for accessing the Internet, an MP3 player for music playback, and a camera application.

Additionally, the program section stores a user interface application using object depth adjustment.

The wireless communicator 150 performs communication operations for voice calls, video calls and data calls under control of the controller 170. To achieve this, the wireless communicator 150 may include a radio frequency transmitter for upconverting the frequency of a signal to be transmitted and amplifying the signal, and a radio frequency receiver for low-noise amplifying a received signal and downconverting the frequency of the received signal. The wireless communicator 150 may include a mobile communication module (based on 3G, 3.5G or 4G mobile communication), a local area communication module (such as a Wi-Fi module), and a digital broadcast receiving module (such as a DMB module).

The audio processor 160 sends an audio signal from the controller 170 to the speaker SPK, and sends an audio signal, e.g., a voice signal, input from the microphone MIC to the controller 170. That is, under control of the controller 170, the audio processor 160 outputs voice or sound data as audible sound through the speaker SPK, and converts an audio signal linput from the microphone MIC into a digital signal and sends the digital signal to the controller 170.

The controller 170 controls the overall operation of the mobile terminal, controls signal exchange between internal components thereof, and performs data processing. The controller 170 controls the supply of power from a battery to the internal components, and executes various applications stored in the program section. In particular, the controller 170 includes a depth adjuster.

Figure 2:
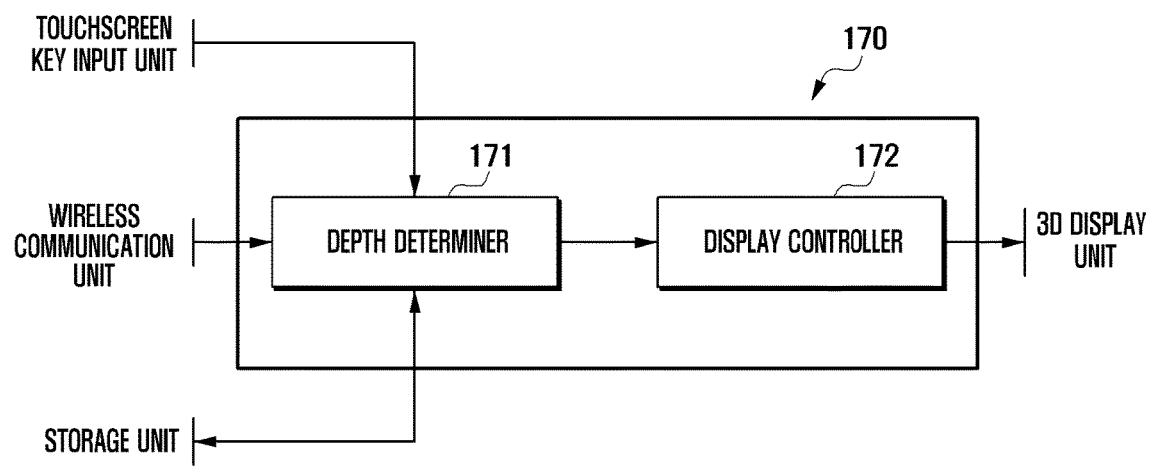
FIG. 2 illustrates a configuration of a depth adjuster according to an embodiment of the present invention.

FIG. 2 illustrates a configuration of a depth adjuster according to an embodiment of the present invention. Such a depth adjuster may be included in the controller 170 or as a separate entity. In the following description, the depth adjuster is assumed to be included in the controller 170.

Referring to FIG. 2, the controller 170, as a depth adjuster, includes a depth determiner 171 and a display controller 172. The depth determiner 171 determines the depth of an object to be displayed, based on attribute information of the object. For example, the depth determiner 171 receives the attribute information of the object from the touchscreen 110, key input device 120, memory 140, or wireless communicator 150.

Upon receipt of the attribute information, the depth determiner 171 determines the depth of the object with reference to a lookup table, as described above, and forwards the depth information to the display controller 172.

The display controller 172 controls the 3D display 130 to display 3D images, and controls the depth of an object to be displayed. Specifically, the display controller 172 receives depth information from the depth determiner 171, and controls the disparity between the left object and right object according to the depth information.

Although not illustrated in FIG. 1, the mobile terminal may also include a camera for capturing still or moving images of a target object, a sensor module for sensing location changes, and a Global Positioning Satellite (GPS) module. With the digital convergence trend, it should be apparent to those skilled in the art that the mobile terminal 100 may further include a unit comparable to the above-described units, and one unit thereof may be removed or replaced with another unit.

Further, in addition to the touchscreen 110 and key input device 120, a touch pad and track ball may also be used as an input device.

FIG. 3 illustrates examples of disparity according to an embodiment of the present invention.

Referring to FIG. 3, Z+ represents crossed disparity, Z0 represents zero disparity, and Z- represents uncrossed disparity. Here, the reference plane for disparity may be the screen of the display part 131. When an object produces zero disparity, the user perceives the object to be placed on the screen. When an object produces crossed disparity, the user perceives the object to be placed in front of the screen. When an object produces uncrossed disparity, the user perceives the object to be placed behind the screen.

Figure 4:
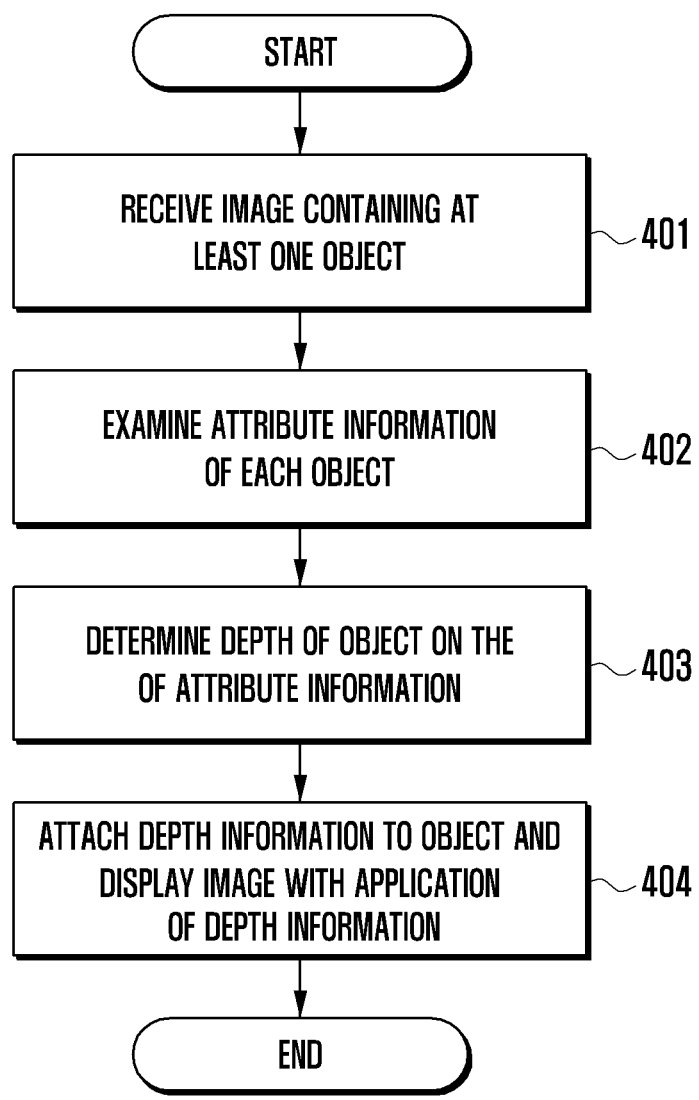
FIG. 4 is a flowchart illustrating a method of displaying a 3D object according to an embodiment of the present invention.

FIG. 4 is a flowchart illustrating a method of displaying a 3D object according to an embodiment of the present invention.

Referring to FIG. 4, the controller 170 receives an image including one or more objects from the memory 140 or wireless communicator 150 in step 401. In step 402, the controller 170 examines attribute information of each object. For example, the attribute information may be received together with the object or may be pre-stored in the memory 140.

In step 403, the controller 170 determines the depth of each object based on the corresponding attribute information. In step 404, the controller 170 attaches depth information to each object and controls the 3D display unit to display the image. Here, the 3D display 130 displays objects with user input information differently than objects without user input information.

Figure 5:
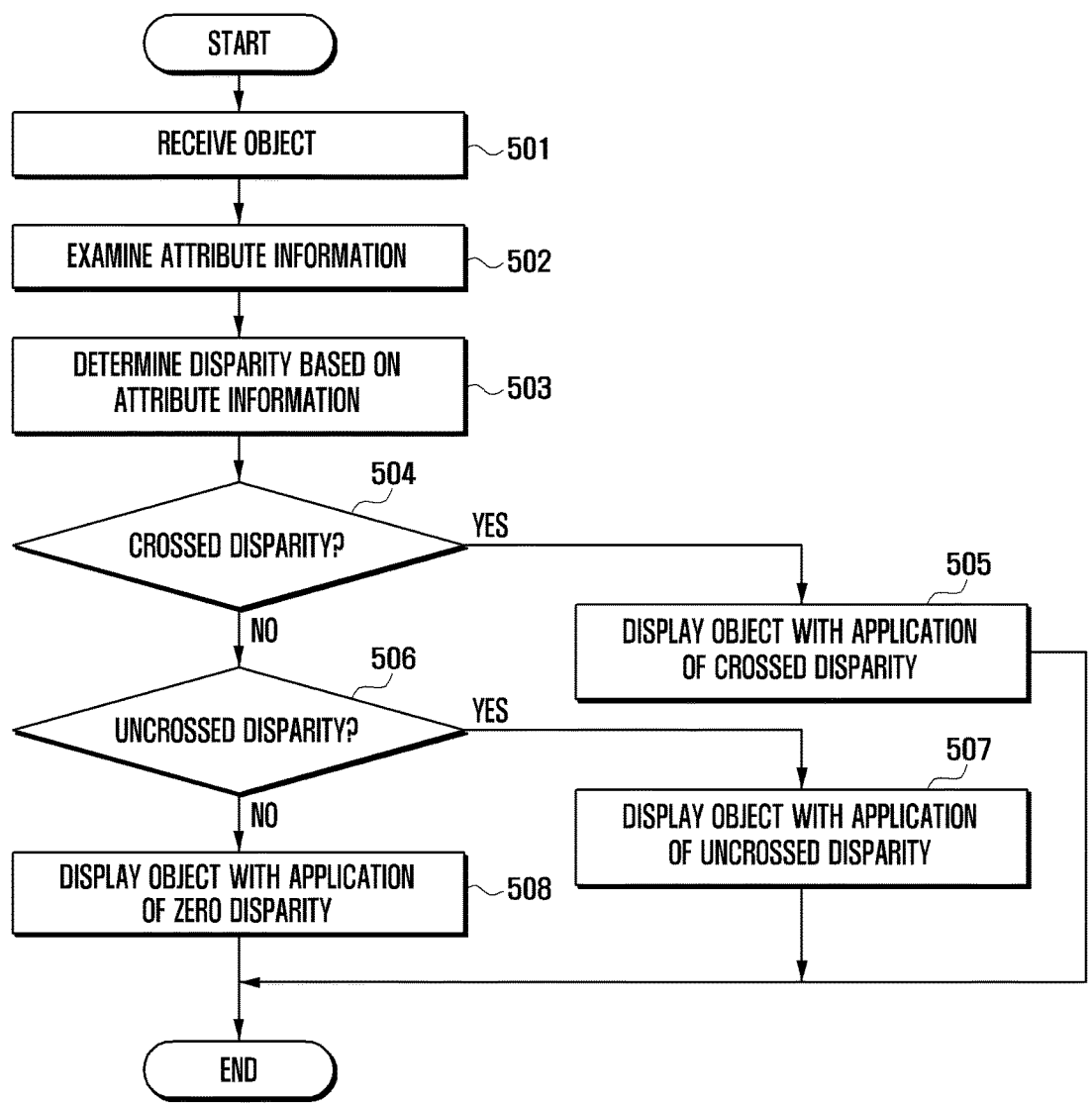
FIG. 5 is a flowchart illustrating a method of displaying a 3D object according to an embodiment of the present invention.

FIG. 5 is a flowchart illustrating a method of displaying a 3D object according to an embodiment of the present invention.

Referring to FIG. 5, the controller 170 receives an object from the memory 140 or wireless communicator 150 in step 501. In step 502, the controller 170 examines attribute information of the received object, and in step 503, the controller 170 determines the disparity value of the object by searching a given lookup table for the attribute information.

In step 504, the controller 170 checks whether the disparity value corresponds to crossed disparity. When the disparity value corresponds to crossed disparity, the controller 170 controls the 3D display 130 to display the object with crossed disparity in step 505.

However, when the disparity value does not correspond to crossed disparity in step 504, the controller 170 checks whether the disparity value corresponds to uncrossed disparity in step 506. When the disparity value corresponds to uncrossed disparity, the controller 170 controls the 3D display 130 to display the object with uncrossed disparity in step 507.

However, when the disparity value does not correspond to uncrossed disparity, the controller 170 controls the 3D display 130 to display the object with zero disparity in step 508.

Figure 6:
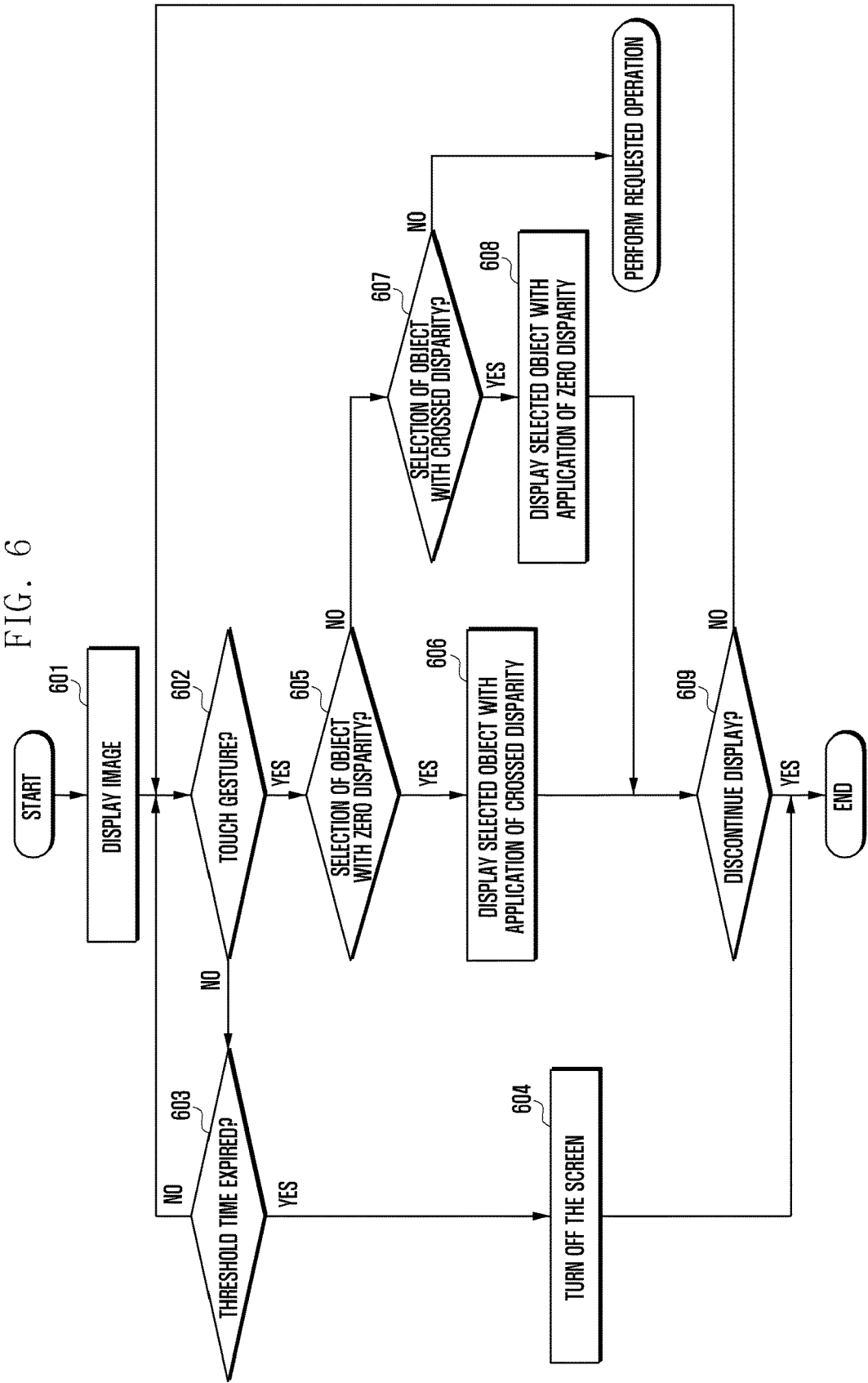
FIG. 6 is a flowchart illustrating a method of displaying a 3D object according to an embodiment of the present invention.

FIG. 6 is a flowchart illustrating a method of displaying a 3D object according to an embodiment of the present invention.

Referring to FIG. 6, the controller 170 controls the 3D display 130 to display an image in step 601. Here, the image may be a 2D image or a 3D image, and may be one of various screens such as a lock screen, home screen, application screen, menu screen, keypad screen, message handling screen, and Internet access screen.

A user may manipulate the touchscreen 110 or the key input device 120 during the image display. For example, when the user manipulates the touchscreen 110, the touchscreen 110 sends a touch event corresponding to a touch gesture of the user to the controller 170, which then senses the touch gesture.

In step 602, the controller 170 checks whether a touch gesture is sensed. When no touch gesture is sensed, the controller 170 checks expiration of a threshold time in step 603. Here, the threshold time is set for automatic screen turn-off.

When no touch gesture is sensed before expiration of the threshold time in step 603, the controller 170 turns off the screen of the 3D display 130 in step 604. However, when the threshold time has not yet expired in step 603, the controller 170 returns to step 602 and continues to check for an occurrence of a touch gesture.

When a touch gesture is sensed at step 602, the controller 170 checks whether the touch gesture is related to selection of an object with zero disparity in step 605. When the touch gesture is related to selection of an object with zero disparity, the controller 170 controls the 3D display 130 to display the selected object so that the object produces crossed disparity in step 606. As a result, the selected object appears to protrude and the user may intuitively recognize the selected object.

When the touch gesture is not related to the selection of an object with zero disparity in step 605, the controller 170 checks whether the touch gesture is related to selection of an object with crossed disparity in step 607. When the touch gesture is related to selection of an object with crossed disparity, the controller 170 controls the 3D display 130 to display the selected object so that the object produces zero disparity in step 608. As a result, the selected object appears to recede. For example, step 608 may correspond to a deselection of a previously selected object.

When the touch gesture is not related to the selection of an object with crossed disparity in step 607, the controller 170 performs an operation corresponding to the touch gesture.

After changing object disparity, the controller 170 checks whether a display end request is entered in step 609. When a display end request is not entered, the controller 170 returns to step 602, and when the display end request is entered, the controller 170 ends the operation.

Figure 7:
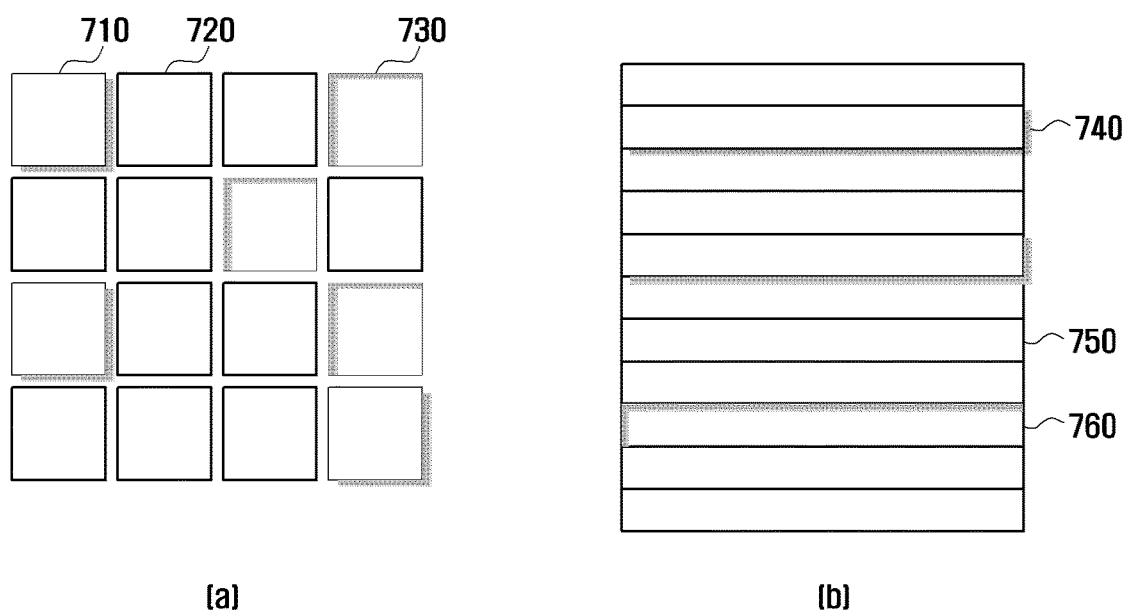
FIGS. 7 and 8 are screen representations illustrating object configurations according to embodiments of the present invention.
Figure 8:
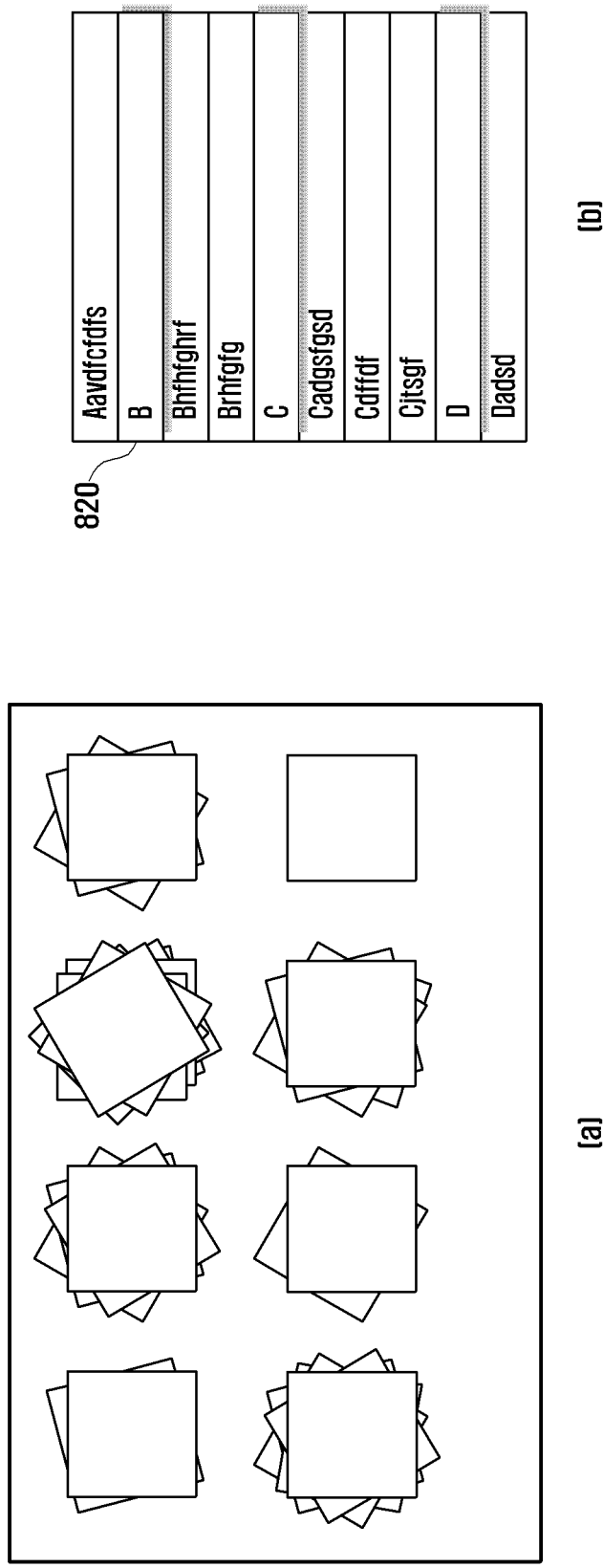

FIGS. 7 and 8 are screen representations illustrating object configurations according to embodiments of the present invention.

Referring to FIG. 7, as illustrated in image (a) of FIG. 7, the 3D display 130 displays sixteen objects in a grid view under control of the controller 170. In image (a) of FIG. 7, reference symbol 710 indicates an object that appears to be closest to the user, reference symbol 730 indicates an object that appears to be farthest from the user, and reference symbol 720 indicates an object that appears to be inbetween the farthest object 730 and the closest object 710. Although three levels of object depths are illustrated, object depths may be classified into four or more levels or two levels.

As illustrated in image (b) of FIG. 7, the 3D display 130 displays eleven objects in a list view under control of the controller 170. In image (b) of FIG. 7, reference symbol 740 indicates an object that appears to be closest to the user, reference symbol 760 indicates an object that appears to be farthest from the user, and reference symbol 750 indicates an object that appears to be inbetween the farthest object 760 and the closest object 740.

Referring to FIG. 8, objects are displayed in a form of a folder. Here, a folder is used to package multiple related content items or applications. When a folder is selected by the user, the controller 170 controls the 3D display 130 to display information on the selected folder. An image representing a folder may have a shape indicating the number of content items or applications contained in the folder (or the total size of the folder).

For example, as illustrated in image (a) of FIG. 8, a folder is represented as a stack. In addition, under control of the controller 170, the 3D display 130 displays folders so that depths of the folders are different from each other according to the number of members therein or total sizes thereof. For example, the 3D display 130 makes folders having larger total sizes appear to be closer to the user.

Further, objects may be classified into different categories. Here, as illustrated in image (b) of FIG. 8, the 3D display 130 performs display operation to make titles 820 of the categories appear to be closer to the user in comparison to objects.

Additionally, the 3D display 130 may adjust the depth of an object according to size information (in bytes) of the object under control of the controller 170.

Figure 9:
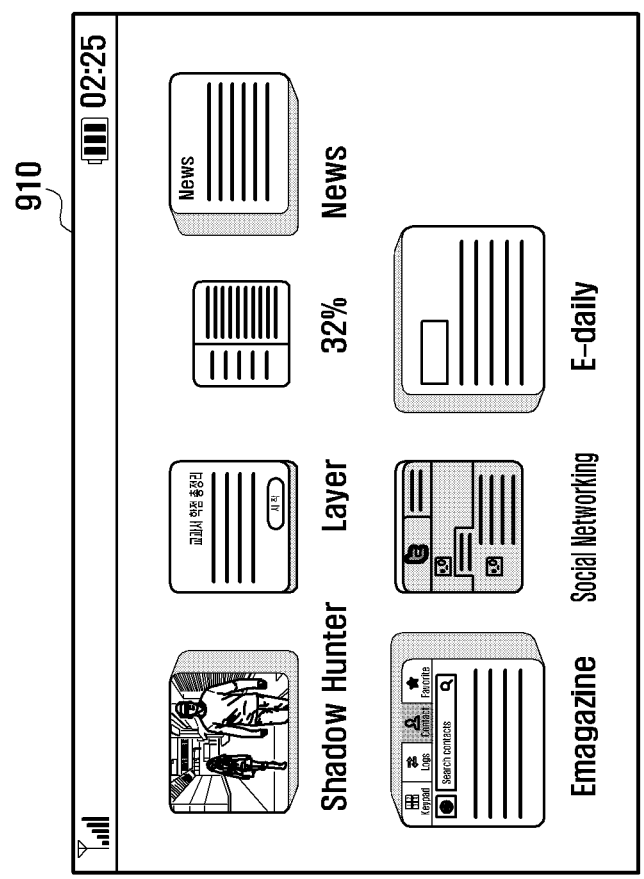
FIG. 9 is a screen representation illustrating an adjustment of object depths based on size information according to an embodiment of the present invention.

FIG. 9 is a screen representation illustrating an adjustment of object depths based on size information according to an embodiment of the present invention.

Referring to FIG. 9, the 3D display 130 displays a home screen 910 including seven application icons. In particular, the 3D display 130 displays the icons such that depths of the icons are different, based on size information of a corresponding application, under control of the controller 170. For example, the 3D display 130 makes icons of applications having larger sizes appear closer to the user or farther from the user.

Although not illustrated, the 3D display 130 may display an application screen including a plurality of content icons.

For example, the 3D display 130 may display many thumbnails representing different documents. Here, the 3D display 130 may make thumbnails associated with documents having larger sizes appear to be closer to the user or make the same appear to be farther from the user.

Figure 10:
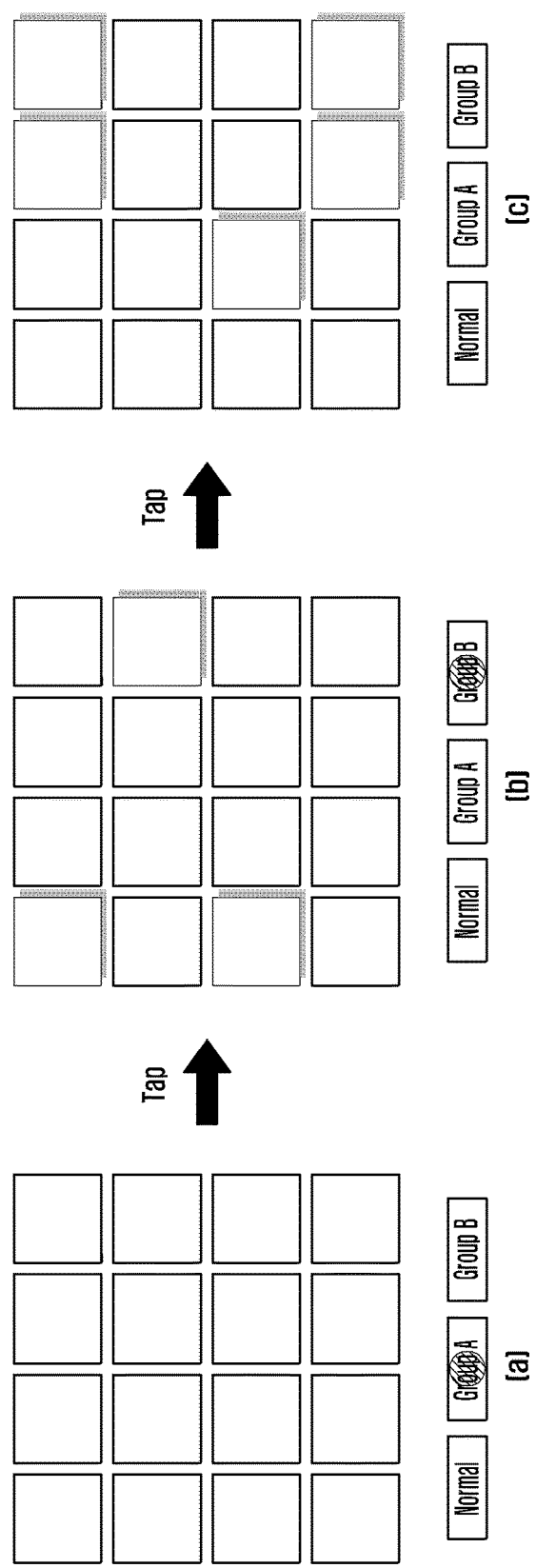
FIGS. 10 and 11 are screen representations illustrating an adjustment of object depths based on user input information according to embodiments of the present invention.
Figure 11:
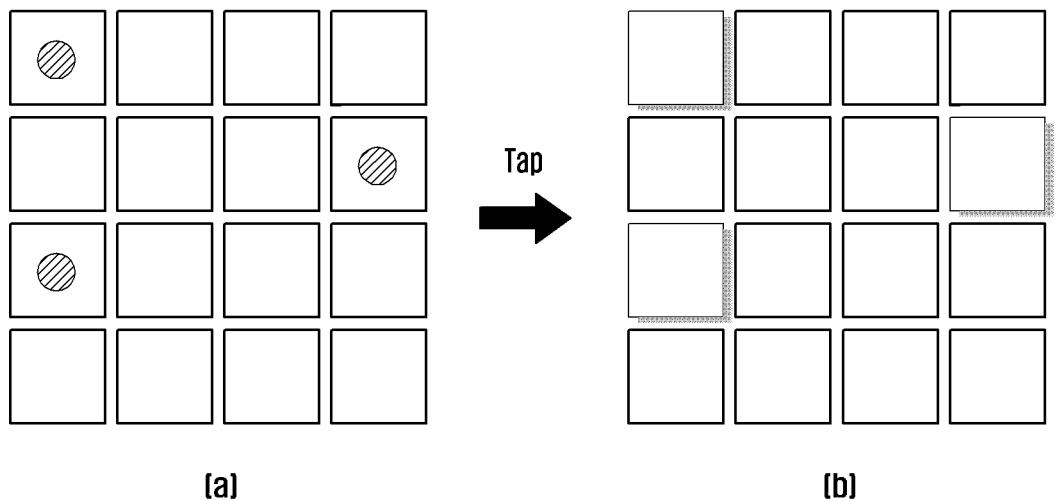

FIGS. 10 and 11 are screen representations illustrating adjustments of object depths according to user input information according to embodiments of the present invention.

Referring to FIG. 10, the 3D display 130 displays a plurality of objects on a 2D plane, as illustrated in image (a) of FIG. 10. In addition, the 3D display 130 displays category labels at a lower portion of the screen. Here, it is assumed that objects are classified into three categories (Normal, Group A, and Group B).

When the user taps "Group A", the touchscreen 110 sends a corresponding touch event to the controller 170. The controller 170 adjusts disparity values of objects belonging to Group A, and the 3D display 130 makes the objects belonging to Group A appear closer to the user, as illustrated in image (b) of FIG. 10. Thereafter, when the user taps "Group B", the controller 170 adjusts disparity values of the objects belonging to Group A and adjusts disparity values of the objects belonging to Group B. Specifically, the 3D display 130 makes the objects belonging to Group A return to their previous states and makes the objects belonging to Group B appear closer to the user, as illustrated in image (c) of FIG. 10.

Referring to FIG. 11, when a plurality of objects are displayed, as illustrated in image (a) of FIG. 11, when the user taps objects, the controller 170 controls the 3D display 130 to make the tapped objects appear to protrude, as illustrated in image (b) of FIG. 11.

The above-described methods of the present invention may be implemented as computer programs and may be stored in various computer readable storage media. The computer readable storage media may store program instructions, data files, data structures and combinations thereof. The program instructions may include instructions developed specifically for the present invention and existing general-purpose instructions. The computer readable storage media may include magnetic media such as a hard disk and floppy disk, optical media such as a Compact Disc (CD)-Read Only Memory (ROM), and a Digital Versatile Disc (DVD), magneto-optical media such as a floptical disk, and memory devices such as a ROM and a Random Access Memory (RAM). The program instructions may include machine codes produced by compilers and high-level language codes executable through interpreters.

In accordance with the above-described embodiments of the present invention, a user can access and manage multiple content items and applications stored in a mobile terminal utilizing a 3D image display function.

Although certain embodiments of the present invention have been described in detail hereinabove, it should be understood that many variations and modifications of the basic inventive concept described herein will still fall within the spirit and scope of the present invention as defined in the appended claims and their equivalents.

What is claimed is:

1. A method of displaying a three dimensional (3D) image in a mobile communication terminal, the method comprising:

displaying an image comprising at least one object;

detecting a touch event on an object among the at least one object with the image displayed for selection of the object;

changing a three dimensional depth of the object if a first touch gesture is detected while maintaining a touch state which is occurred by the touch event; and performing a function related to the object if a second touch gesture is detected while maintaining the touch state which is occurred by the touch event, wherein changing the three dimensional depth of the object comprises:

checking the three dimensional depth of the selected object;

determining the three dimensional depth of the selected object based on the checked three dimensional depth without any additional input; and displaying the selected object reflecting the determined three dimensional depth.

2. The method of claim 1, wherein changing the three dimensional depth of the object further comprises:
identifying attribute information of the selected object, including category information, usage frequency information, size information, hyperlink information, application execution information, and user input information.

3. The method of claim 2, wherein displaying the selected object comprises displaying the selected object by adjusting disparity between a left object and a right object constituting the selected object based on the usage frequency information.

4. The method of claim 2, wherein the user input information includes the information of a content item or an application entered through a touch screen.

5. The method of claim 2, wherein determining the three dimensional depth of the selected object comprises determining a disparity between a left object and a right object constituting the object based on the attribute information.

6. The method of claim 5, wherein the disparity is determined to be one of crossed disparity, zero disparity, and uncrossed disparity.

7. The method of claim 6, wherein determining the disparity comprising:
reflecting the crossed disparity on the selected object, if the determined disparity is the zero disparity; and
reflecting the zero disparity on the selected object, if the determined disparity is the crossed disparity.

8. The method of claim 7, wherein the reference plane is a screen of a display.

9. The method of claim 6, wherein the crossed disparity displays the selected object in front of a reference plane, the uncrossed disparity displays the selected object behind the reference plane, and the zero disparity displays the selected object on the reference plane.

10. An apparatus for displaying a three dimensional (3D) image in a mobile communication terminal, the apparatus comprising:
a memory configured to store an object and a disparity associated with the object;
a 3D display configured to display an image comprising at least one object with depth perception;
a touchscreen; and
a controller configured to:
control the touchscreen to detect a touch event on an object among the at least one object with the image displayed for selection of the object;
control the 3D display to change a three dimensional depth of the object if the touchscreen detects a first touch gesture while maintaining a touch state which is occurred by the touch event; and
perform a function related to the object if the touchscreen detects a second touch gesture while maintaining the touch state which is occurred by the touch event,
wherein changing the three dimensional depth of the object comprises:
checking the three dimensional depth of the selected object,
determining the three dimensional depth of the selected object based on the checked three dimensional depth without any additional input, and
controlling the 3D display to display the selected object reflecting the determined three dimensional depth.

11. The apparatus of claim 10, wherein the controller is further configured to identify attribute information of the selected object.

12. The apparatus of claim 11, wherein the attribute information comprises at least one of:
category information;
usage frequency information;
size information;
hyperlink information;
application execution information; and
user input information.

13. The apparatus of claim 12, wherein the controller is further configured to adjust a disparity between a left object and a right object constituting the selected object based on the usage frequency information.

14. The apparatus of claim 12, wherein the user input information comprises information of a content item or an application entered by a user through the touchscreen.

15. The apparatus of claim 10, wherein the controller comprises a depth determiner configured to determine a disparity between a left object and a right object constituting the object to be one of a crossed disparity, a zero disparity and an uncrossed disparity.

16. The apparatus of claim 15,
wherein the controller is further configured to reflect the crossed disparity on the selected object if the determined disparity is the zero disparity, and reflect the zero disparity on the selected object if the determined disparity is the crossed disparity.

17. The apparatus of claim 16, wherein the crossed disparity displays the object in front of a reference plane, the uncrossed disparity displays the object behind the reference plane, and the zero disparity displays the object on the reference plane.

18. The apparatus of claim 17, wherein the reference plane comprises a screen of the 3D display.

* * * * *